G. ORBIN.
SPRING CUSHION TIRE.
APPLICATION FILED FEB. 19, 1920.
1,351,784.
Patented Sept. 7, 1920.
2 SHEETS—SHEET 1.
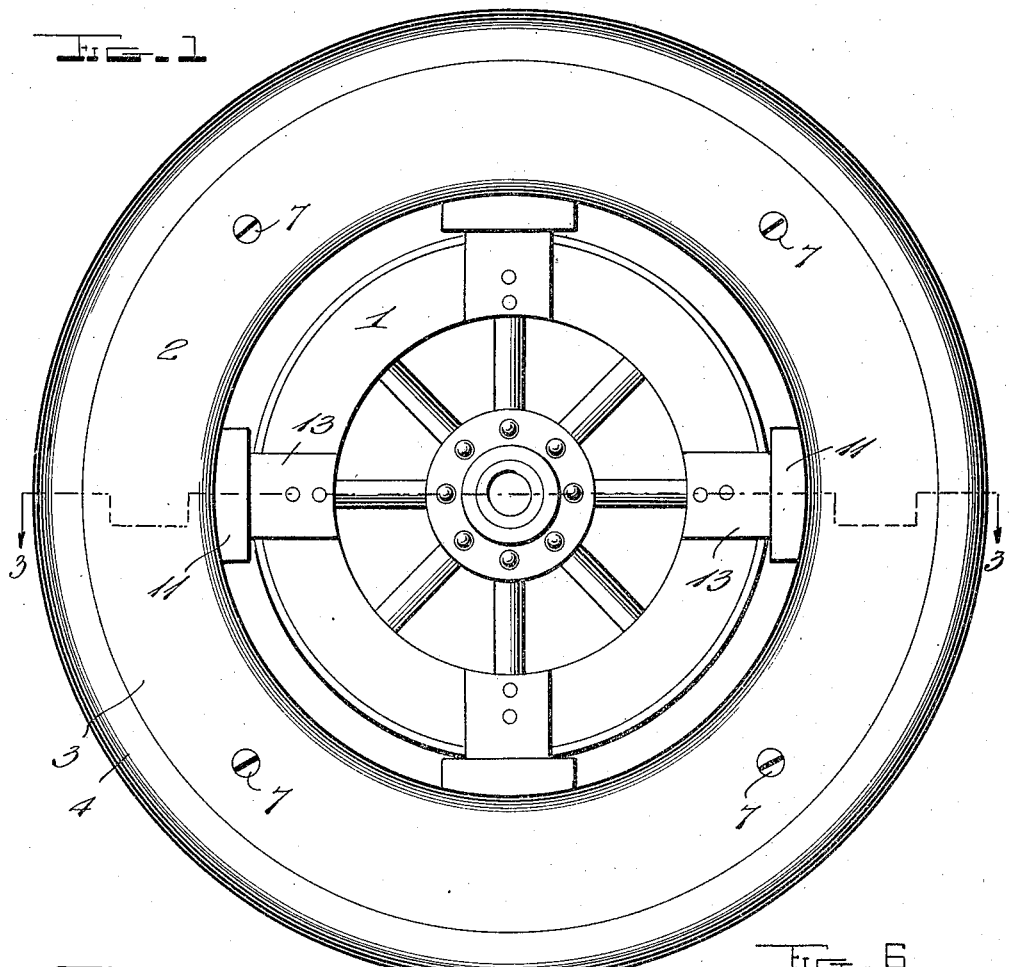
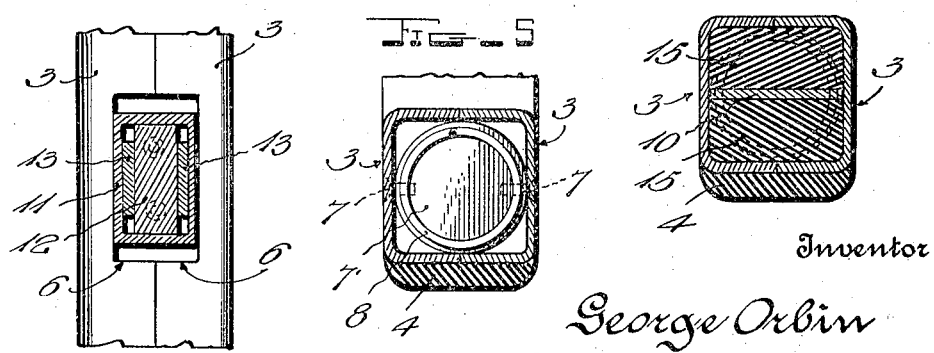
Inventor
George Orbin
By H. B. Willson & Co
Attorneys

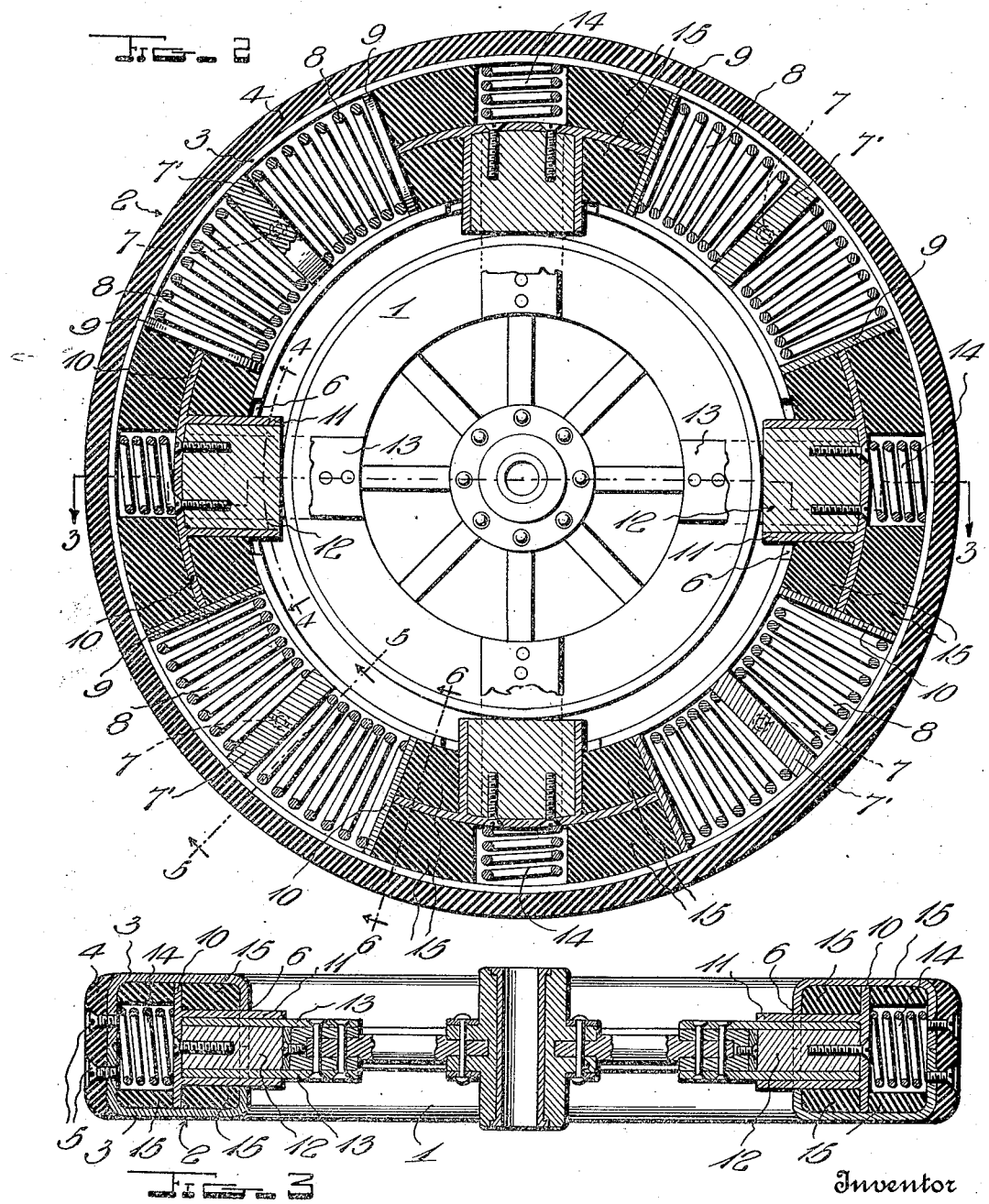

UNITED STATES PATENT OFFICE.

GEORGE ORBIN, OF HOBOKEN, PENNSYLVANIA, ASSIGNOR OF ONE-THIRD TO CHARLES MILTON HAYS, OF HOBOKEN, PENNSYLVANIA.

SPRING-CUSHION TIRE.

1,351,784.

Specification of Letters Patent.

Patented Sept. 7, 1920.

Application filed February 19, 1920. Serial No. 360,005.

*To all whom it may concern:*

Be it known that I, GEORGE ORBIN, a citizen of the United States, residing at Hoboken, in the county of Allegheny and State of Pennsylvania, have invented certain new and useful Improvements in Spring-Cushion Tires; and I do declare the following to be a full, clear, and exact description of the invention, such as will enable others skilled in the art to which it appertains to make and use the same.

This invention relates to improvements in spring tires and it has for its object to do away with the usual pneumatic tire by substituting for it, a spring cushioned tire of simple and novel construction which possesses all of the advantages of the pneumatic tire, rides just as easy, is less expensive, and a great deal more durable.

Another object of the invention is to provide a tire of the above mentioned type which is of such construction that it will move not only eccentrically but circumferentially with respect to the wheel and thus more effectively absorb sudden jarring of the vehicle. Also, because of this yieldable feature of the tire in a circumferential direction, the life of the tire will be greatly increased, more so than if it were rigid because it will yield when it strikes an obstruction.

A further object of the invention is to generally improve upon similar devices by providing a new and novel construction which will more effectively absorb the shocks, one which is relatively light in weight, easy to repair and comparatively inexpensive to manufacture.

Other objects and advantages of the invention will be apparent during the course of the following description.

In the accompanying drawings forming a part of this specification and in which like numerals are employed to designate like parts throughout the same:

Figure 1 is a side elevation of a conventional vehicle wheel with my improved spring tire in position thereon.

Fig. 2 is a central longitudinal sectional view thereof.

Fig. 3 is a transverse sectional view taken on the plane of the lines 3—3 of Figs. 1 and 2.

Fig. 4 is a detail sectional view taken on the line 4—4 of Fig. 2,

Figs. 5 and 6 are transverse sections on the planes of the lines 5—5, and 6—6 of Fig. 2.

In the drawings, wherein for the purpose of illustration is shown a preferred embodiment of my invention, the numeral 1 designates a vehicle wheel of the usual construction upon which my spring tire, designated as a whole by the numeral 2, is secured.

My tire comprises a substantially rectangular circumferentially split metal casing 3 which is provided on its outer periphery with a rubber tread 4, secured in position by means of screws or other fastenings 5. The inner periphery of the casing is equipped with a plurality of spaced rectangular slots 6, the purpose of which will hereinafter be set forth. Secured within the casing by means of screws 7 are a plurality of transversely disposed partitions 7′ which serve as abutments for one of the ends of the circumferentially arranged coiled springs 8, there being a plurality of movable metal disks or plates 9 also in the casing against which the other ends of the coiled springs bear. There are four sets of these coiled springs, and while there may be more or less, it is believed that this number is sufficient to obtain an effective result. Each set of springs may be determined by the circular plates 9 which are spaced from one another by the coiled springs in one instance and by the arcuate plates 10 in the other instance, the ends of the latter normally engaging the plates 9 and moving them toward each other when a shock is taken up. These arcuate plates 10 carry rectangular sockets 11 which serve to receive plungers or spokes 12 which are permanently secured therein at one of their ends while their other ends bear on the periphery of the wheel 1. Lateral displacement of the tire 2 from the wheel 1 is prevented by oppositely disposed plates 13 which are secured on opposite sides of the rim of the wheel and are freely slidable in the sockets 11. Telescopic movement of parts 11 and 13 is obtained by this construction, and the tire is properly retained in position on the wheel. The parts 11, 12, and 13 extend through the slots 6, which are of a length to extend beyond the opposite ends of the sockets 11, whereby circumferential movement of the tire will be permitted and the shock more effectively taken up than if the tire had an eccentric movement alone. Shocks which move the tire toward and from the periphery of the wheel are taken up by the plungers 12, the movement of which is resisted not only by coiled springs 14 between the plates 10 and the casing, but also by the rubber blocks 15 on opposite sides of the arcuate plates 10. In other words, when an obstruction or uneven place in the road is encountered, the inactive portion of the tire will move eccentrically with respect to the periphery of the wheel, and the whole tire will, under some circumstances, move circumferentially with respect to the wheel, which movements will effectively take up the shocks.

The operation of my wheel is as follows: Assuming that the wheel encounters an obstruction or uneven place in its path of travel and it is in the position shown in Fig. 2, it will be seen that the tire, which is freely movable with respect to the wheel, will assume a position which is eccentric with respect to the wheel. In so doing the load will be borne by the three lowermost plungers 12, the bottom one of which will act in such a manner as to compress the outer rubber member 15 and the coiled spring 14. Such compression of these parts will in turn compress the adjacent coiled springs 8. If the shock is extremely severe, the now horizontally alined plates 13 will move downwardly until they engage the lower inner wall of the socket members 11 in which they are disposed. Such action of these parts will force the lower sections of the inner rubber blocks 15 down on, and compress the coiled springs 8 with which they co-act. In this manner the shock is absorbed. It may be stated at this point, that both the inner and outer blocks 15 function to take up the shock as is clear from the foregoing description. They not only serve in this manner, but they also function to retain the circular plates 9 in proper position, that is, they prevent these plates from rocking around the ends of the plates 10 and becoming inclined with respect to the plates 10, which is of course undesirable. Further describing the operation of my wheel, it will be seen that while the three lowermost plungers are in action, the remaining one at the top will be inactive, however, it will become active as soon as the wheel begins to rebound. During the rebound, the operation of the parts is just the reverse of that described. Not only is the shock absorbed in the above mentioned manner, but it is also partially taken up by the circumferential movement of the tire. With both an eccentric movement and a circumferential movement of the tire, it will be seen that all shocks will be effectively absorbed and easy riding assured.

A careful consideration of the foregoing description taken in connection with the accompanying drawings will enable persons familiar with such devices to obtain a clear understanding of the construction, advantages, and operation of my tire. In view of this, a more lengthy description is deemed unnecessary.

It is to be understood, however, that the form of my invention herein shown and described is to be taken as a preferred form of the same, and that various minor changes in the shape, size, and arrangement of parts may be resorted to without departing from the spirit of the invention or the scope of the subjoined claims.

What I claim as my invention is:

1. A spring tire comprising a casing having a plurality of slots formed in its inner periphery at spaced intervals, transverse partitions secured in the casing at points between the slots, coiled springs in the casing bearing at one end against said partitions, plates resting against the other ends of the springs, other plates, bearing at their opposite ends against said first named plates, plungers extending through the slots and carried by said other plates, and cushion means between the last named plates and the casing.

2. A spring tire comprising a two-part casing, having a plurality of slots formed in its inner periphery, partitions secured transversely in the casing at points between the slots, circumferentially extending coiled springs, bearing at one end against said partitions, plates in the casing contacting the other ends of the coiled springs, other plates carrying sockets, the opposite ends of the last named plates contacting the first named plates and the sockets extending through and beyond the slots, rectangular blocks secured in the sockets, and coiled springs between said second named plates and the casing.

3. A spring tire comprising a casing having a plurality of elongated slots formed in its inner periphery at spaced intervals, and partitions secured transversely in the casing at points between the slots, circumferentially extending coiled springs, bearing at one end against the partitions, circular movable plates contacting the other ends of the springs, arcuate plates, including integral sockets, the ends of the arcuate plates normally bearing against said circular plates to move them against the action of the circumferential coiled springs, said sockets extending through and beyond the slots, a plunger disposed in each socket the sides thereof being spaced from the walls of the socket, a wheel, guide plates secured on opposite sides of the rim of the wheel and extending into the spaces between the plungers and walls of the sockets, and a coiled spring and resilient blocks between each arcuate plate and casing.

4. A device of the character set forth comprising a wheel, a casing surrounding the same, a plurality of plungers, including sockets, extending from the interior of the casing to the exterior through the inner periphery thereof and bearing on the periphery of the wheel, cushioning means in the casing with which the plungers co-act, and plates secured on the wheel and slidable into said sockets.

In testimony whereof I have hereunto set my hand.

GEORGE ORBIN.